(12) United States Patent
Takikawa et al.

(10) Patent No.: US 9,133,907 B2
(45) Date of Patent: Sep. 15, 2015

(54) CENTRIFUGAL-PENDULUM VIBRATION ABSORBING DEVICE AND ORDER SETTING METHOD FOR THE SAME

(71) Applicants: AISIN AW CO., LTD, Anjo-shi, Aichi-ken (JP); AISIN AW INDUSTRIES CO., LTD, Echizen-shi, Fukui (JP)

(72) Inventors: Yoshihiro Takikawa, Tsushima (JP); Yoichi Oi, Ama (JP); Hiroki Nagai, Anjo (JP); Takayuki Miyaoka, Anjo (JP); Yuichiro Hirai, Anjo (JP); Takuya Yoshikawa, Fukui (JP); Tomonori Kinoshita, Sabae (JP); Aki Ogawa, Sabae (JP)

(73) Assignees: AISIN AW CO., LTD., Anjo (JP); AISIN AW INDUSTRIES CO., LTD., Echizen (JP)

( * ) Notice: Subject to any disclaimer, the term of this patent is extended or adjusted under 35 U.S.C. 154(b) by 0 days.

(21) Appl. No.: 14/138,669

(22) Filed: Dec. 23, 2013

(65) Prior Publication Data

US 2014/0174250 A1    Jun. 26, 2014

Related U.S. Application Data

(60) Provisional application No. 61/746,006, filed on Dec. 26, 2012.

(30) Foreign Application Priority Data

Dec. 26, 2012 (JP) ................. 2012-282757

(51) Int. Cl.
*F16F 15/14* (2006.01)
*F16F 15/173* (2006.01)

(52) U.S. Cl.
CPC ........... *F16F 15/173* (2013.01); *Y10T 74/2122* (2015.01)

(58) Field of Classification Search
CPC ....... F16F 15/173; F16F 7/1028; F16F 15/14; F16F 15/16; Y10T 74/2122; Y10T 74/2128
USPC ............ 74/572.2, 573.1, 574.2, 574.3, 574.4; 123/192.1; 464/180; 180/381; 192/3.29; 188/378–380
See application file for complete search history.

(56) References Cited

U.S. PATENT DOCUMENTS 8,161,740 B2 *   4/2012   Krause et al. ................. 60/338
8,651,965 B2 *   2/2014   Amano et al. ................. 464/46

(Continued)

FOREIGN PATENT DOCUMENTS

| JP | U-1-115039 | 8/1989 |
| JP | A-5-296291 | 11/1993 |
| JP | A-2011-504987 | 2/2011 |
| WO | WO 2012/124014 A1 | 9/2012 |

OTHER PUBLICATIONS

International Search Report issued in International Patent Application No. PCT/JP2013/082780 mailed Mar. 11, 2014 (with translation).

*Primary Examiner* — Thomas R. Hannon
*Assistant Examiner* — Adam D Rogers
(74) *Attorney, Agent, or Firm* — Oliff PLC

(57) ABSTRACT

A centrifugal-pendulum vibration absorbing device disposed within a liquid chamber that stores a liquid, the centrifugal-pendulum vibration absorbing device having a support member coupled to a rotary element that is rotated by power from a drive device; and a mass body supported by the support member so as to be swingable. An order of vibration of the mass body is determined on the basis of an order of vibration to be damped generated by the drive device in consideration of at least a force caused by a centrifugal liquid pressure generated within the liquid chamber along with rotation of the drive device to act on the mass body.

10 Claims, 4 Drawing Sheets

(56) References Cited

U.S. PATENT DOCUMENTS

| | | |
|---|---|---|
| 8,839,924 B2 * | 9/2014 | Takikawa et al. ............ 192/3.29 |
| 2010/0242466 A1 | 9/2010 | Krause et al. |
| 2012/0080281 A1 * | 4/2012 | Takikawa et al. ............ 192/3.28 |
| 2013/0116054 A1 | 5/2013 | Amano et al. |
| 2014/0174869 A1 * | 6/2014 | Takikawa et al. ............. 188/378 |

* cited by examiner

CENTRIFUGAL-PENDULUM VIBRATION ABSORBING DEVICE AND ORDER SETTING METHOD FOR THE SAME

INCORPORATION BY REFERENCE

The disclosures of Japanese Patent Application No. 2012-282757 filed on Dec. 26, 2012, including the specification, drawings and abstract, and U.S. Provisional Application No. 61/746,006, filed Dec. 26, 2012 are incorporated herein by reference in its entirety.

BACKGROUND OF THE INVENTION

The present invention relates to a centrifugal-pendulum vibration absorbing device disposed within a liquid chamber that stores a liquid and including a support member coupled to a rotary element that is rotated by power from a drive device and a mass body supported by the support member so as to be swingable, and to an order setting method for the centrifugal-pendulum vibration absorbing device.

Description of the Related Art

Hitherto, there has been known a force transfer device including a centrifugal-pendulum vibration absorbing device and including at least one input member, an output member, a vibration damping device disposed within a chamber that can be at least partially filled with an operating medium, in particular oil, and a centrifugal-pendulum rotational speed adaptive dynamic absorber coupled to the vibration damping device, in which power is transferred between a drive device and a driven device (see Published Japanese Translation of PCT Application No. 2011-504987 (JP 2011-504987 A), for example). In the force transfer device, the rotational speed adaptive dynamic absorber is designed to have an effective order qeff that is larger than an order q of excitation of the drive device by a predetermined order offset value qF in relation to the effect of oil. The order offset value qF is determined so as to vary in proportion to variations in order q of excitation not to match the order q of excitation.

SUMMARY OF THE INVENTION

The technique for setting the effective order qeff described in JP 2011-504987 A mentioned above is considered to set the effective order qeff in consideration of a resistance due to relative motion between a mass body and rotating oil, that is, a viscous drag. However, the technique described in JP 2011-504987 A is hardly theoretically grounded, and the studies conducted by the inventors revealed that the effect of a viscous drag on swing motion of a mass body in the presence of a liquid such as working oil was small. Thus, even if the order of vibration of the mass body in the centrifugal-pendulum vibration absorbing device is set as described in JP 2011-504987 A, the vibration absorbing performance of the centrifugal-pendulum vibration absorbing device may not be improved, and may rather be reduced in some cases.

It is therefore a main object of the present invention to improve the vibration absorbing performance by adequately setting the order of vibration of a mass body in a centrifugal-pendulum vibration absorbing device disposed within a liquid chamber that stores a liquid.

In order to achieve the foregoing main object, the centrifugal-pendulum vibration absorbing device and the order setting method for the centrifugal-pendulum vibration absorbing device according to the present invention adopt the following means.

A first aspect of the present invention provides a centrifugal-pendulum vibration absorbing device disposed within a liquid chamber that stores a liquid and including: a support member coupled to a rotary element that is rotated by power from a drive device; and a mass body supported by the support member so as to be swingable. In the centrifugal-pendulum vibration absorbing device, an order of vibration of the mass body is determined on the basis of an order of vibration generated by the drive device in consideration of at least a force that acts on the mass body caused by a centrifungal liquid pressure generated within the liquid chamber when the drive device rotates.

The inventors conducted diligent studies on a centrifugal-pendulum vibration absorbing device disposed within a liquid chamber that stores a liquid. As a result, the inventors found that, in the centrifugal-pendulum vibration absorbing device of this type, the effect of a viscous drag on swing motion of the mass body in the presence of the liquid such as the working oil was extremely small, and swing motion of the mass body in the presence of the liquid was significantly affected by a force that acts on the mass body caused by a centrifungal liquid pressure generated within the liquid chamber when the drive device rotates. Thus, when the order of vibration of the mass body is determined on the basis of an order of vibration generated by the drive device in consideration of at least the force that acts on the mass body caused by a centrifungal liquid pressure generated within the liquid chamber when the drive device rotates (the rotary element driven by the drive device), it is possible to improve the vibration absorbing performance by more adequately setting the order of vibration of the mass body.

The order of vibration may be determined from a value obtained by dividing the force caused by the centrifugal liquid pressure when the rotary element is rotated at a certain rotational angular speed to act on the mass body by a square of the certain rotational angular speed. That is, the mass body may be coupled to the support member so as to swing about a pendulum fulcrum; and when the order of vibration is defined as "n", a distance from a rotational center of the rotary element to the pendulum fulcrum is defined as "R", a distance from the pendulum fulcrum to a center of gravity of the mass body is defined as "r", and a value obtained by dividing the force caused by the centrifugal liquid pressure to act on the mass body by the square of the rotational angular speed and further dividing the resulting quotient by a product of the mass and the distance from the pendulum fulcrum to the center of gravity of the mass body is defined as "α", the order of vibration n may be determined using the following relational formula:

$$n=\sqrt{[(R/r-\alpha]}$$

Consequently, the order of vibration of the mass body in the centrifugal-pendulum vibration absorbing device disposed within the liquid chamber which stores the liquid can be made adequate in consideration of the force that acts on the mass body caused by a centrifungal liquid pressure generated within the liquid chamber when the drive device rotates.

When the order of vibration to be damped is defined as "Ntag", the centrifugal-pendulum vibration absorbing device disposed within the liquid chamber which stores the liquid may be designed to meet the following relational formula:

$$Ntag-0.2 \leq n \leq Ntag+0.2$$

More preferably, the centrifugal-pendulum vibration absorbing device may be designed to meet the following relational formula:

$$Ntag-0.1 \le n \le Ntag+0.1$$

This makes it possible to adequately set the order of vibration of the mass body in consideration of the effect of the manufacturing tolerance or the like in addition to the effect of the force caused by the centrifugal liquid pressure to act on the mass body.

The force caused by the centrifugal liquid pressure to act on the mass body may be determined using at least a density of the liquid and a difference in area between an outer peripheral surface and an inner peripheral surface of the mass body. This makes it possible to easily obtain the force caused by the centrifugal liquid pressure to act on the mass body.

A second aspect of the present invention provides an order setting method for a centrifugal-pendulum vibration absorbing device disposed within a liquid chamber that stores a liquid and including a support member coupled to a rotary element that is rotated by power from a drive device and a mass body supported by the support member so as to be swingable. The method includes: determining an order of vibration of the mass body on the basis of an order of vibration generated by the drive device in consideration of at least a force that acts on the mass body caused by a centrifungal liquid pressure generated within the liquid chamber when the drive device rotates.

According to the method, it is possible to improve the vibration absorbing performance of the centrifugal-pendulum vibration absorbing device disposed within the liquid chamber which stores the liquid by adequately setting the order of vibration of the mass body.

The order of vibration may be determined from a value obtained by dividing the force caused by the centrifugal liquid pressure when the rotary element is rotated at a certain rotational angular speed to act on the mass body by a square of the certain rotational angular speed. That is, the mass body may be coupled to the support member so as to swing about a pendulum fulcrum; and when the order of vibration is defined as "n", a distance from a rotational center of the rotary element to the pendulum fulcrum is defined as "R", a distance from the pendulum fulcrum to a center of gravity of the mass body is defined as "r", and a value obtained by dividing the force caused by the centrifugal liquid pressure to act on the mass body by the square of the rotational angular speed and further dividing the resulting quotient by a product of the mass and the distance from the pendulum fulcrum to the center of gravity of the mass body is defined as "α", the order of vibration n may be determined using the following relational formula:

$$n \le \sqrt{[(R/r-\alpha]}$$

When the order of vibration to be damped is defined as "Ntag", the centrifugal-pendulum vibration absorbing device may be designed to meet the following relational formula:

$$Ntag-0.2 \le n \le Ntag+0.2$$

More preferably, the centrifugal-pendulum vibration absorbing device may be designed to meet the following relational formula:

$$Ntag-0.1 \le n \le Ntag+0.1$$

The force caused by the centrifugal liquid pressure to act on the mass body may be determined using at least a density of the liquid and a difference in area between an outer peripheral surface and an inner peripheral surface of the mass body.

DETAILED DESCRIPTION OF THE EMBODIMENTS

Now, an embodiment of the present invention will be described with reference to the drawings.

Figure 1:
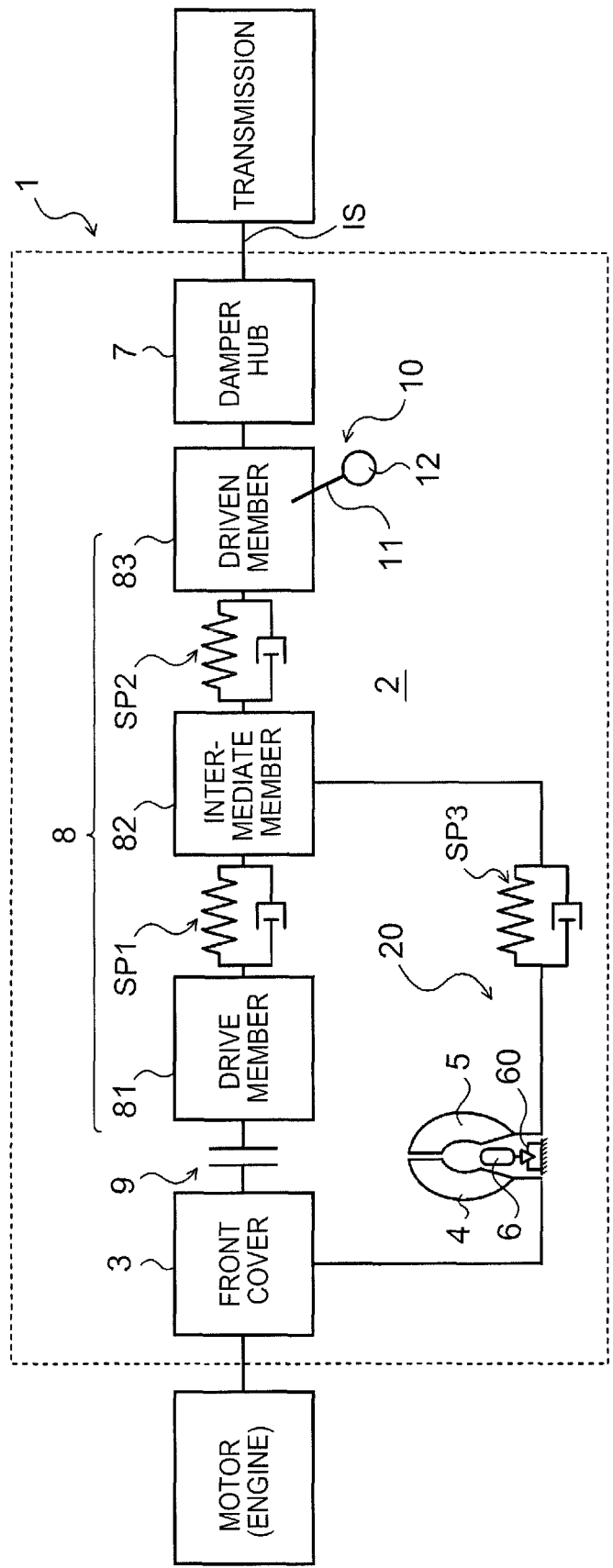
FIG. 1 is a schematic diagram illustrating the configuration of a starting device including a centrifugal-pendulum vibration absorbing device according to an embodiment of the present invention.

FIG. 1 is a schematic diagram illustrating the configuration of a starting device 1 including a centrifugal-pendulum vibration absorbing device 10 according to an embodiment of the present invention. The starting device 1 illustrated in the drawing is mounted on a vehicle including an engine (an internal combustion engine) serving as a motor, and transmits power from the engine to a transmission that is an automatic transmission (AT) or a continuously variable transmission (CVT). In addition to the centrifugal-pendulum vibration absorbing device 10, the starting device 1 includes a front cover (an input member) 3 coupled to a crankshaft of the engine, a pump impeller (an input-side fluid transmission element) 4 fixed to the front cover 3, a turbine runner (an output-side fluid transmission element) 5 disposed coaxially with the pump impeller 4 so as to be rotatable, a stator 6 that rectifies a flow of working oil (a working fluid) from the turbine runner 5 to the pump impeller 4, a damper hub (an output member) 7 fixed to an input shaft IS of the transmission, a damper mechanism 8 connected to the damper hub 7, and a single-plate friction lock-up clutch 9 including a lock-up piston (not illustrated) connected to the damper mechanism 8.

The pump impeller 4 and the turbine runner 5 face each other. The stator 6 is disposed between and coaxially with the pump impeller 4 and the turbine runner 5 so as to be rotatable. The rotational direction of the stator 6 is set to only one direction by a one-way clutch 60. The pump impeller 4, the turbine runner 5, and the stator 6 form a torus (an annular flow passage) that allows circulation of the working oil (a fluid) inside a fluid transmission chamber (a liquid chamber) 2 defined by the front cover 3 and a pump shell of the pump impeller 4, and functions as a torque converter having a torque amplifying function. In the starting device 1, the stator 6 and the one-way clutch 60 may be omitted, and the pump impeller 4 and the turbine runner 5 may function as a fluid coupling.

The damper mechanism 8 includes a drive member 81 serving as an input element capable of rotating together with the lock-up piston of the lock-up clutch 9, a plurality of first coil springs (first elastic bodies) SP1, an intermediate member (an intermediate element) 82 engaged with the drive member 81 via the first coil springs SP1, a plurality of second coil springs (second elastic bodies) SP2 having rigidity (a spring constant) that is higher than that of the first coil springs SP1 and disposed apart from the first coil springs SP1 in the radial direction of the starting device 1, for example, and a driven member (an output element) 83 engaged with the intermediate member 82 via the second coil springs SP2.

The drive member 81 includes a plurality of abutment portions that abut against respective first ends of the corresponding first coil springs SP1, and holds the plurality of first coil springs SP1. The intermediate member 82 includes a plurality of abutment portions that abut against respective second ends of the corresponding first coil springs SP1, and a plurality of abutment portions that abut against respective first ends of the corresponding second coil springs SP2. The driven member 83 includes a plurality of abutment portions that abut against respective second ends of the corresponding second coil springs SP2, and is fixed to the damper hub 7. In the starting device 1 according to the embodiment, in addition, the intermediate member 82 of the damper mechanism 8, which tends to vibrate between the first and second coil springs SP1 and SP2, is coupled to the turbine runner 5 via a plurality of third coil springs (third elastic bodies) SP3. The plurality of third coil springs SP3 and the turbine runner 5 form a dynamic damper 20. This enables both the centrifugal-pendulum vibration absorbing device 10 and the dynamic damper 20 to favorably absorb vibration of the intermediate member 82 and vibration of the entire damper mechanism 8 during engagement of the lock-up clutch 9 (during lock-up).

The lock-up clutch 9 operates on a hydraulic pressure from a hydraulic control device (not illustrated). The lock-up clutch 9 establishes and releases lock-up in which the front cover (an input member) 3 and the damper hub 7, that is, the input shaft IS of the transmission, are coupled to each other via the damper mechanism 8. The lock-up piston (not illustrated) forming the lock-up clutch 9 is supported by the damper hub 7 so as to be movable in the axial direction and rotatable, for example. An annular friction material is affixed to a surface of the lock-up piston on the outer peripheral side and on the side of the front cover 3. The drive member 81 discussed above is coupled to the outer peripheral portion of the lock-up piston. The starting device 1 may be configured to include a multi-plate friction lock-up clutch in place of the single-plate friction lock-up clutch 9.

As illustrated in FIG. 1, the centrifugal-pendulum vibration absorbing device 10 includes a support member (a flange) 11 coaxially attached to the driven member 83 serving as a rotary element of the damper mechanism 8, and a plurality of (for example, three to four) mass bodies 12 that are supported by the support member 11 so as to be swingable and that are adjacent to each other in the circumferential direction. The centrifugal-pendulum vibration absorbing device 10 is disposed inside the fluid transmission chamber 2 (a liquid chamber) defined by the front cover 3 and the pump shell of the pump impeller 4 to store the working oil. The centrifugal-pendulum vibration absorbing device 10 absorbs (damps) vibration between the front cover 3 and the damper hub 7 with the plurality of mass bodies 12 swung in the same direction with respect to the support member 11 inside the fluid transmission chamber 2 filled with the working oil along with rotation of the support member 11 to apply to the driven member 83 of the damper mechanism 8 vibration that is opposite in phase to vibration (resonance) of the driven member 83.

In the embodiment, two (a pair of) first guide notch portions (not illustrated) are formed in the support member 11 for each of the mass bodies 12, and two (a pair of) second guide notch portions (not illustrated) are formed in each of the mass bodies 12. The support member 11 and each of the mass bodies 12 are coupled to each other via a guide roller formed by integrating a first roller that rolls on the inner peripheral surfaces of the first guide notch portions of the support member 11 and a second roller that rolls on the inner peripheral surfaces of the second guide notch portions of each of the mass bodies 12 (all not illustrated). The pair of first guide notch portions of the support member 11 corresponding to each of the mass bodies 12 are formed as long holes that are horizontally asymmetrical or horizontally symmetrical with respect to each other and that each extend with a curve that is convex toward the radially outer side of the support member 11 as their axis, for example, and disposed symmetrically with respect to the swing center line of the mass body 12 (a line including the rotational center (an axis) of the driven member 83 (the support member 11) and a pendulum fulcrum PF). In contrast, the pair of second guide notch portions of each of the mass bodies 12 are formed as long holes that are horizontally asymmetrical or horizontally symmetrical with respect to each other and that each extend with a curve that is convex toward the center of the support member 11 as their axis, for example, and disposed symmetrically with respect to the swing center line of the mass body 12.

Figure 2:
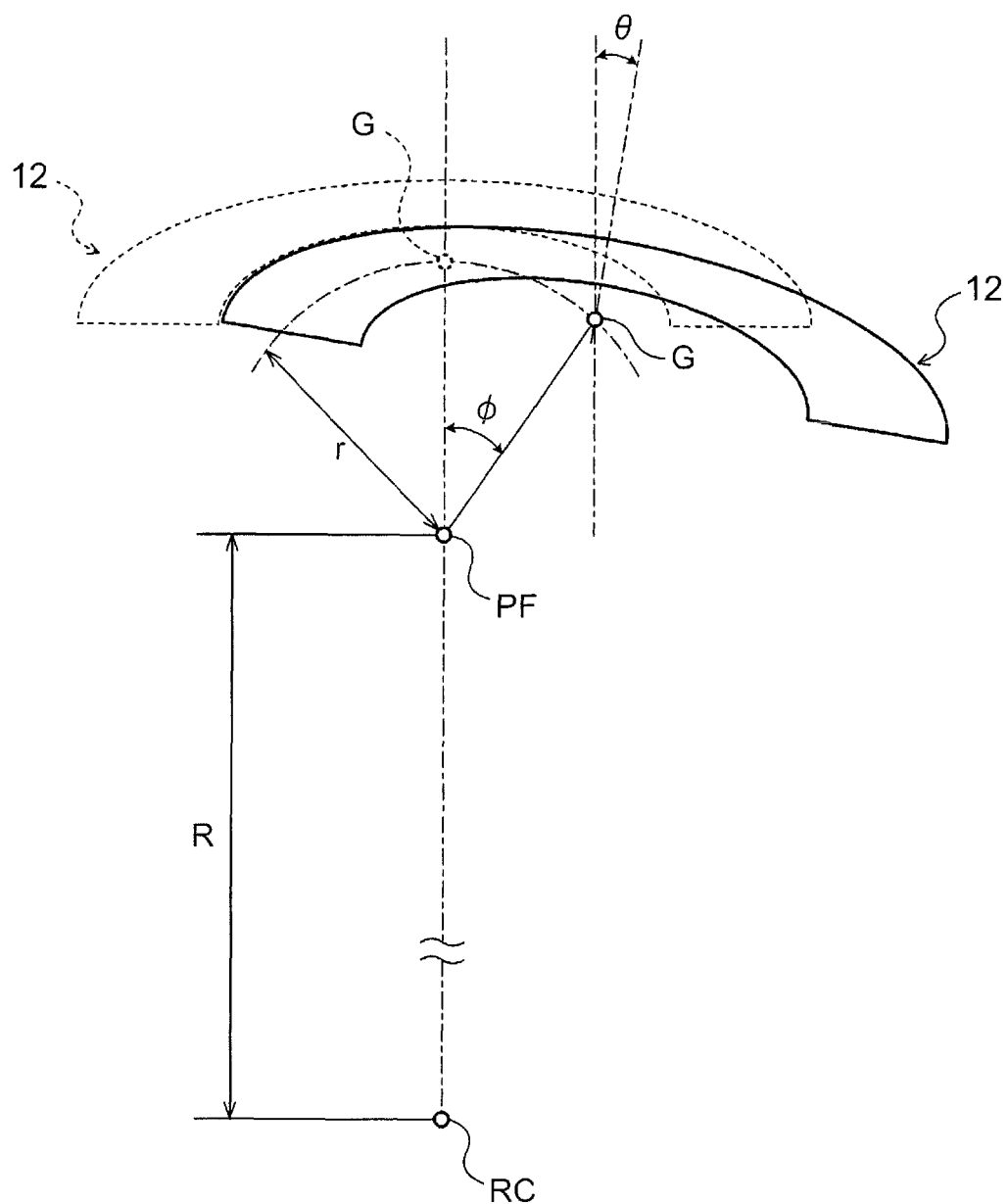
FIG. 2 is a schematic diagram illustrating the configuration of the centrifugal-pendulum vibration absorbing device according to the embodiment of the present invention.

Consequently, in the centrifugal-pendulum vibration absorbing device 10 according to the embodiment, the guide roller described above is guided by both the first guide notch portions of the support member 11 and the second guide notch portions of the mass bodies 12, which allows each of the mass bodies 12 to turn about the pendulum fulcrum PF and rotate about a center of gravity G of the mass body 12 as the mass body 12 is swung within the swing range as illustrated in FIG. 2 along with rotation of the support member 11. As a result, it is possible to damp vibration to be transmitted to the support member 11 by utilizing not only swing motion of the mass bodies 12 about the pendulum fulcrum PF but also the moment of rotation of the mass bodies 12 about the center of gravity G. One first guide notch portion may be formed in the support member 11 for each of the mass bodies 12, and one second guide notch portion may be formed in each of the mass bodies 12. The centrifugal-pendulum vibration absorbing device may be formed as a so-called bifilar device that includes as the support member 11 two arm members that support one mass body so as to be swingable.

Next, a method of setting the order of vibration of the mass body 12 in the centrifugal-pendulum vibration absorbing device 10 will be described with reference to FIGS. 2 to 4.

With regard to the centrifugal-pendulum vibration absorbing device disposed inside the liquid chamber such as the fluid transmission chamber 2 which stores the working oil as discussed above, the inventors first conducted diligent studies on the effect of the liquid such as the working oil on motion of the mass body. Then, as a result of conducting various analyses, it was revealed that in this type of centrifugal-pendulum vibration absorbing device, the effect of a viscous drag on swing motion of the mass body in the presence of the liquid such as the working oil was extremely small, and the swing motion of the mass body in the presence of the liquid was significantly affected by a force due to a centrifugal liquid pressure (a centrifugal hydraulic pressure) generated within the liquid chamber such as the fluid transmission chamber 2 along with rotation of the rotary element such as the driven member 83 which is rotated by power from the engine.

Figure 3:
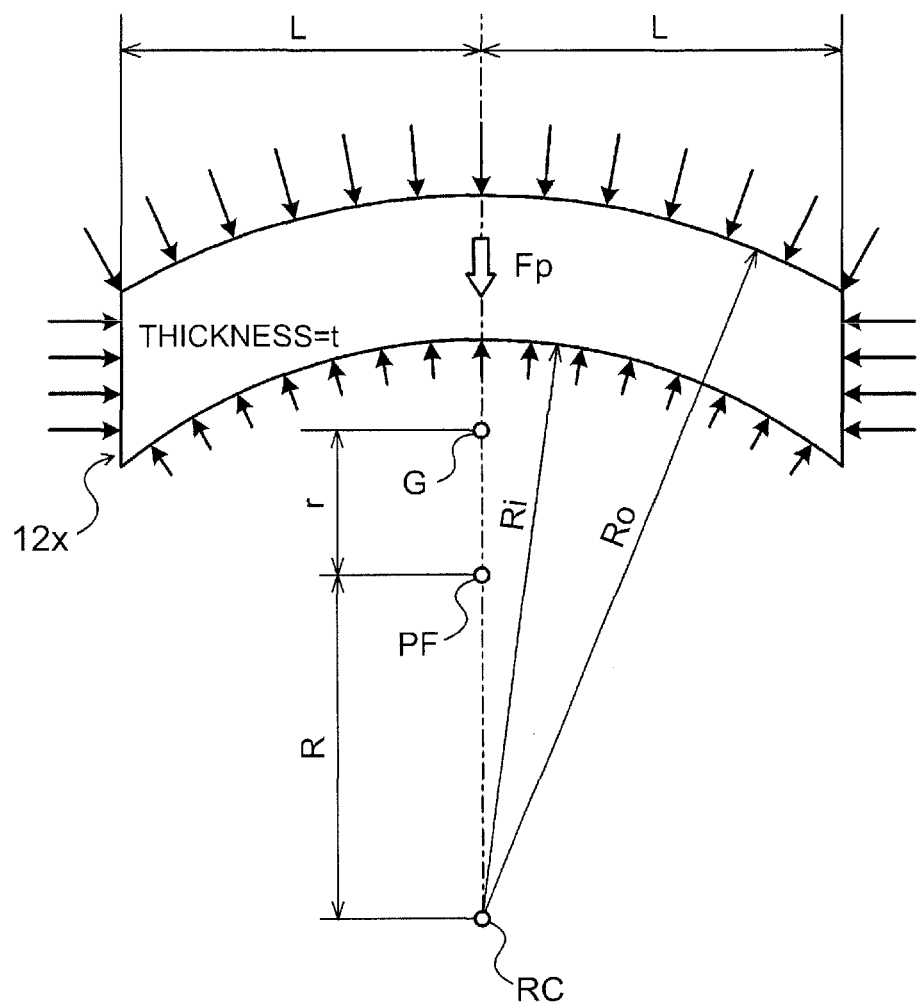
FIG. 3 illustrates a method of setting the order of vibration of a mass body forming the centrifugal-pendulum vibration absorbing device.

Here, a consideration is made on a force due to a centrifugal liquid pressure that acts on an arcuate mass body 12x such as that illustrated in FIG. 3 when the mass body 12x swings about the pendulum fulcrum PF without rotating about the center of gravity along with rotation of the rotary element such as the driven member 83. The mass body 12x illustrated in FIG. 3 has an outer peripheral surface in the shape of a cylindrical surface centered on a rotational center RC of the rotary element (the support member), an inner peripheral surface in the shape of a concave cylindrical surface centered on the rotational center RC, and two side surfaces that are parallel to the swing center line (see the clash-dotted line in the drawing), and has a uniform thickness. When the distance (radius of curvature) from the rotational center RC to the outer peripheral surface of the mass body 12x is defined as "Ro", the distance (radius of curvature) from the rotational center RC to the inner peripheral surface of the mass body 12x is defined as "Ri", the thickness of the mass body 12x is defined as "t", the length from the swing center line to the left and right end portions of the mass body 12x is defined as "L", the rotational angular speed of the rotary element is defined as "ω", and the density of the liquid such as the working oil is defined as "ρ", a force Fp due to the centrifugal liquid pressure that acts on the mass body 12x is represented by the following formula (1):

[Formula 1]

$$Fp = \rho \cdot \omega^2 \cdot t \cdot L \cdot (Ro^2 - Ri^2) \qquad (1)$$

When the rotary element such as the driven member 83 rotates, a centrifugal force Fc acts on the mass body 12x. Thus, when the mass of the mass body 12x is defined as "m", the distance from the rotational center RC to the pendulum fulcrum PF is defined as "R", and the distance from the pendulum fulcrum PF to the center of gravity G of the mass body 12x is defined as "r", a force F that acts on the mass body 12x when the mass body 12x swings about the pendulum fulcrum PF along with rotation of the rotary element is represented by the following formula (2). Then, if a dimensionless value obtained by dividing the force Fp due to the centrifugal liquid pressure which acts on the mass body 12x by the square of the rotational angular speed ω and further dividing the resulting quotient by the product of the mass m and the distance r is defined as "α" as represented by the following formula (3), the force F which acts on the mass body 12x is represented by the following formula (4):

[Formula 2]

$$F = Fc + Fp = m \cdot R \cdot \omega^2 - \rho \cdot \omega^2 \cdot t \cdot L \cdot (Ro^2 - Ri^2) \qquad (2)$$

$$= m \cdot r \cdot \omega^2 \cdot \left[ \frac{R}{r} - \frac{\rho \cdot t \cdot L \cdot (Ro^2 - Ri^2)}{m \cdot r} \right]$$

$$\alpha = \frac{\rho \cdot t \cdot L \cdot (Ro^2 - Ri^2)}{m \cdot r} \qquad (3)$$

$$F = m \cdot r \cdot \omega^2 \cdot \left( \frac{R}{r} - \alpha \right) \qquad (4)$$

Further, when the rotational angle of the mass body 12x about the pendulum fulcrum PF during swing about the pendulum fulcrum PF along with rotation of the rotary element is defined as "φ", the equation of motion of the centrifugal-pendulum vibration absorbing device including the mass body 12x is represented by the following formula (5). It should be noted that the term on the right side of the formula (5) is a viscous term indicating the effect of a viscous drag due to relative motion between the mass body and the rotating liquid (working oil), and that "c" is a constant. The viscous term of the formula (5) can be represented by the following formula (6) by introducing an appropriate model into the viscous term. The formula (5) can be modified into the following formula (7) using the relationship of the formula (6). It should be noted that in the formula (6), "μ" is a viscosity coefficient, "k" is a coefficient determined on the basis of the viscosity of the liquid and the frequency of swing motion of the mass body, and "A" is the surface area of the mass body 12x.

[Formula 3]

$$m \cdot r \cdot \ddot{\phi} + m \cdot r \cdot \omega^2 \cdot \left( \frac{R}{r} - \alpha \right) \cdot \phi = -c \cdot \dot{\phi} \qquad (5)$$

$$c \cdot \dot{\phi} = -\mu \cdot k \cdot A \cdot (R - r) \cdot \dot{\phi} \qquad (6)$$

$$\ddot{\phi} + \frac{\mu \cdot k \cdot A \cdot (R + r)}{m \cdot r} \cdot \dot{\phi} + \omega^2 \left( \frac{R}{r} - \alpha \right) \cdot \phi = 0 \qquad (7)$$

The following formula (8) which indicates an order of vibration $n_x$ of the mass body 12x which swings about the pendulum fulcrum PF without rotating about the center of gravity in the presence of the liquid can be obtained by introducing a dimensionless value "β" indicating the viscous term into the natural vibration frequency of the mass body 12x obtained from the formula (7). It should be noted, however, that the effect of a viscous drag on swing motion of the mass body in the presence of the liquid such as the working oil is extremely small as discussed above. Thus, "β" in the formula (8) can be ignored, and thus the order of vibration $n_x$ of the mass body 12x which swings about the pendulum fulcrum PF without rotating about the center of gravity in the presence of the liquid can be represented by the following formula (9):

[Formula 4]

$$n_x = \sqrt{\frac{R}{r} - \alpha - \beta} \qquad (8)$$

$$n_x = \sqrt{\frac{R}{r} - \alpha} \qquad (9)$$

In obtaining the value α by dividing the force Fp due to the centrifugal liquid pressure which acts on the mass body by the square of the rotational angular speed ω and further dividing the resulting quotient by the product of the mass m and the distance R, in the case where the shape of the mass is relatively simple as with the mass body 12x discussed above, the force Fp caused by the centrifugal liquid pressure to act on the mass body can be obtained easily and accurately by determining the force Fp using the density p of the liquid and the difference in area between the outer peripheral surface and the inner peripheral surface of the mass body. In the case where the shape of the mass body is complicated, the force Fp may be calculated by performing numerical calculation in consideration of the shape of the mass body 12.

In addition to the effect of the liquid such as the working oil on motion of the mass body discussed above, the inventors also conducted diligent studies on setting the order of vibration of a mass body provided in a centrifugal-pendulum vibration absorbing device and coupled to a support member so as to swing about a pendulum fulcrum and rotate about a center of gravity. Then, as a result of various analyses conducted with a focus on a so-called roller centrifugal-pendulum vibration absorbing device in the course of the studies, the inventors found that motion of a mass body in this type of centrifugal-pendulum vibration absorbing device may be treated as motion of a mass body in the so-called roller centrifugal-pendulum vibration absorbing device irrespective of the form (structure).

Figure 4:
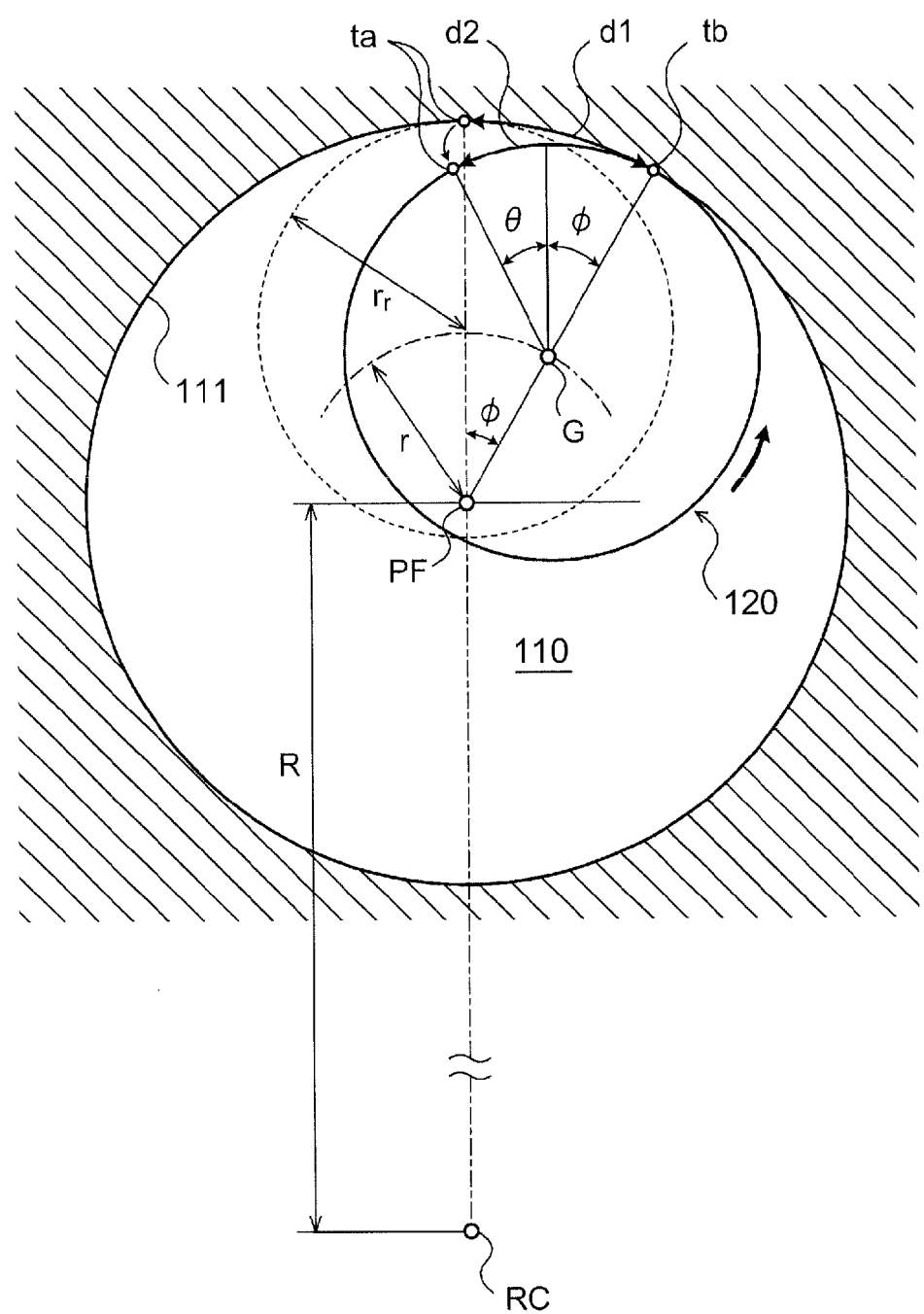
FIG. 4 illustrates the method of setting the order of vibration of the mass body forming the centrifugal-pendulum vibration absorbing device.

As illustrated in FIG. 4, the roller centrifugal-pendulum vibration absorbing device includes a guide notch portion 110 (in the example of FIG. 4, a circular opening) formed in a member corresponding to the support member 11 of the centrifugal-pendulum vibration absorbing device 10 described above, and a roller 120 that rolls on a guide surface 111 that is the inner peripheral surface (in the example of FIG. 4, a concave circumferential surface) of the guide notch portion 110. In the roller centrifugal-pendulum vibration absorbing device illustrated in FIG. 4, the roller 120 serving as the mass body rolls on the curved guide surface 111 while rotating about the center of gravity G (an axis). In the light of this, the inventors divided motion of the roller in the roller centrifugal-pendulum vibration absorbing device into translational motion (sliding motion) along the guide surface that does not involve rotation of the roller about the center of gravity and rotational motion of the roller about the center of gravity, and treated motion of the roller as the total of swing motion of the roller only about the pendulum fulcrum without rotation about the center of gravity and rotational motion of the roller about the center of gravity.

Here, it is known that when the distance from the rotational center RC to the pendulum fulcrum PF is defined as "R" and the distance from the pendulum fulcrum PF to the center of gravity G of the mass body is defined as "r", the order of vibration of the mass body provided in the centrifugal-pendulum vibration absorbing device so as to swing about the pendulum fulcrum without rotating about the center of gravity is conveniently represented as $\sqrt{(R/r)}$. In contrast, it is known that the order of vibration of the roller 120 in the roller centrifugal-pendulum vibration absorbing device is conveniently represented as $\sqrt{[(2\cdot R)/(3\cdot r)]}$. In the studies, the inventors focused on the difference between $\sqrt{[(2\cdot R)/(3\cdot r)]}$ and $\sqrt{(R/r)}$ (a decrease). Then, in the light of the fact that translational motion of the roller 120 along the guide surface 111 corresponds to swing motion of the mass body about the pendulum fulcrum PF, the inventors estimated that the difference between $\sqrt{[(2\cdot R)/(3\cdot r)]}$ and $\sqrt{(R/r)}$ was caused by rotational motion of the roller 120 about the center of gravity G, specifically, the moment of inertia due to rotation of the roller 120 about the center of gravity G which was proportional to the square of the ratio $(r/r_r)$ between the radius $r_r$ of the roller 120 and the distance r from the pendulum fulcrum PF to the center of gravity G of the roller 120, and derived the following formula (10). It should be noted that "$n_r$" in the formula (10) indicates the order of vibration of the roller 120, "$m_r$" indicates the mass of the roller 120, "$I_r$" indicates the moment of inertia of the roller 120, "$m\cdot r^2$" indicates the moment of inertia due to translation of the roller 120, and "$I_r\cdot(r/r_r)^2$" indicates the moment of inertia due to rotation of the roller 120. Through verifications performed by analyses or the like, the inventors confirmed that the estimation discussed above was extremely adequate, and that motion of the mass body provided in the centrifugal-pendulum vibration absorbing device and coupled to the support member so as to swing about the pendulum fulcrum and rotate about the center of gravity might be treated as the total of swing motion of the mass body about the pendulum fulcrum without rotation about the center of gravity and rotational motion of the mass body about the center of gravity irrespective of the form (structure).

[Formula 5]

$$n_r = \sqrt{\frac{2R}{3r}} = \sqrt{\frac{R}{r\cdot\left(1+\frac{I_r}{m_r\cdot r_r^2}\right)}} = \sqrt{\frac{m_r\cdot R\cdot r}{m_r\cdot r^2 + I_r\cdot\left(\frac{r}{r_r}\right)^2}} \quad (10)$$

Meanwhile, a distance d1 along the guide surface 111 from a point of tangency ta between the guide surface 111 and the roller 120 with the roller 120 stationary at the swing center to a point of tangency tb between the guide surface 111 and the roller 120 with the roller 120 swung to one side in the swing range is represented as $d1=(r+r_r)\cdot\phi$ from the sum $(r+r_r)$ of the distance r from the pendulum fulcrum PF to the center of gravity G of the roller 120 and the radius $r_r$ of the roller 120 and the rotational angle $\phi$ of the roller 120 (the center of gravity G) about the pendulum fulcrum PF. In addition, a distance d2 along the outer peripheral surface of the roller 120 from a point of tangency ta between the guide surface 111 and the roller 120 with the roller 120 stationary at the swing center to a point of tangency tb between the guide surface 111 and the roller 120 with the roller 120 swung to one side in the swing range is represented as $d2=r_r\cdot(\phi+\theta)$ from the sum $(\phi+\theta)$ of the rotational angle $\phi$ of the roller 120 about the pendulum fulcrum PF and the rotational angle $\theta$ of the roller 120 about the center of gravity G and the radius $r_r$ of the roller. Then, if the roller 120 rolls on the guide surface 111 without slipping, the distance d1 and the distance d2 coincide with each other (d1=d2), and the relationship $\theta/\phi=r/r_r$ is met. Thus, by utilizing this relationship, the ratio $(r/r_r)$ between the radius $r_r$ of the roller 120 and the distance r from the pendulum fulcrum PF to the center of gravity G of the roller 120 can be replaced with the ratio $(\theta/\phi)$ between the rotational angle $\phi$ of the roller 120 about the pendulum fulcrum PF and the rotational angle $\theta$ of the roller 120 about the center of gravity. Consequently, the moment of inertia $(I_r\cdot(r/r_r)^2)$ due to rotation of the roller 120 about the center of gravity G can be represented as $I_r\cdot(\theta/\phi)^2$ using the ratio $(\theta/\phi)$ between the rotational angle $\phi$ of the roller 120 about the pendulum fulcrum PF and the rotational angle $\theta$ of the roller 120 about the center of gravity.

Thus, the order of vibration of the mass body provided in the centrifugal-pendulum vibration absorbing device and coupled to the support member so as to swing about the pendulum fulcrum and rotate about the center of gravity can be determined on the basis of the order of vibration of the mass body which swings about the pendulum fulcrum without rotation about the center of gravity and further in consideration of rotational motion of the mass body about the center of gravity (the moment of inertia due to rotation), that is, the rotational angle of the mass body about the pendulum fulcrum and the rotational angle of the mass body about the center of gravity. Specifically, in the case where the centrifugal-pendulum vibration absorbing device is not disposed within the liquid chamber which stores the liquid (in the case of a dry centrifugal-pendulum vibration absorbing device), and when the order of vibration is defined as "$n_z$", the mass of the mass body is defined as "m", the distance from the rotational center RC to the pendulum fulcrum PF is defined as "R", the distance from the pendulum fulcrum PF to the center of gravity G of the mass body is defined as "r", the rotational angle of the mass body about the pendulum fulcrum PF is defined as "$\phi$", the rotational angle of the mass body about the center of gravity G is defined as "$\theta$", and the moment of inertia of the mass body is defined as "I", the order of vibration $n_z$ can be determined using the following formula (11):

[Formula 6]

$$n_z = \sqrt{\frac{m \cdot R \cdot r}{m \cdot r^2 + I \cdot \left(\frac{\theta}{\phi}\right)^2}} = \sqrt{\frac{R}{r} \cdot \frac{m \cdot r^2}{m \cdot r^2 + I \cdot \left(\frac{\theta}{\phi}\right)^2}} \quad (11)$$

Further, in determining the order of vibration n of the mass body 12 in the centrifugal-pendulum vibration absorbing device 10 disposed within the fluid transmission chamber 2 (a liquid chamber) which stores the working oil (a liquid), a force caused by the centrifugal liquid pressure generated in the fluid transmission chamber 2 along with rotation of the driven member 83 serving as a rotary element to act on the mass body 12 may be considered as with the formula (9) given above. That is, in order to introduce the value α which indicates the force caused by the centrifugal liquid pressure to act on the mass body 12 into the formula (11), "R/r" on the rightmost side of the formula (11) may be replaced with "(R/r−α)" in consideration of the relationship between a simple formula n=√(R/r) indicating the order of vibration of the mass body provided in the centrifugal-pendulum vibration absorbing device so as to swing about the pendulum fulcrum without rotating about the center of gravity and the formula (9) given above.

Thus, in the wet centrifugal-pendulum vibration absorbing device 10 disposed within the fluid transmission chamber 2 which stores the working oil, and when the order of vibration is defined as "n", the mass of the mass body 12 is defined as "m", the distance from the rotational center RC to the pendulum fulcrum PF is defined as "R", the distance from the pendulum fulcrum PF to the center of gravity G of the mass body 12 is defined as "r", the rotational angle of the mass body 12 about the pendulum fulcrum PF is defined as "φ", the rotational angle of the mass body 12 about the center of gravity G is defined as "θ", the moment of inertia of the mass body 12 is defined as "I", and a value obtained by dividing the force Fp caused by the centrifugal hydraulic pressure (centrifugal liquid pressure) to act on the mass body 12 by the square of the rotational angular speed ω and further dividing the resulting quotient by the product of the mass m and the distance r is defined as "α", the order of vibration n may be determined using the following formula (12):

[Formula 7]

$$n = \sqrt{\frac{m \cdot r^2 \cdot \left(\frac{R}{r} - \alpha\right)}{\left[m \cdot r^2 + I \cdot \left(\frac{\theta}{\phi}\right)^2\right]}} \quad (12)$$

When the order of vibration generated by the engine is defined as "Ntag", the centrifugal-pendulum vibration absorbing device 10 is preferably designed such that the order of vibration n obtained from the formula (12) given above meets the following relational formula:

$$Ntag-0.2 \leq n \leq Ntag+0.2 \quad (13),$$

more preferably, $$Ntag-0.1 \leq n \leq Ntag+0.1 \quad (14)$$

That is, it is possible to adequately set the order of vibration n of the mass body 12 in consideration of the effect of the manufacturing tolerance or the like by determining parameters such as the mass m and the shape (the moment of inertia I) of the mass body 12, the distances R and r, and the rotational angles θ and φ so as to meet the formula (13) or (14) given above. In the wet centrifugal-pendulum vibration absorbing device including the mass body 12x which swings about the pendulum fulcrum PF without rotating about the center of gravity, parameters such as the mass m and the shape (the moment of inertia I) of the mass body 12, the distances R and r, and the rotational angles θ and φ may be determined such that the order of vibration $n_x$ obtained from the formula (9) given above meets the formula (13) or (14) given above. In the dry centrifugal-pendulum vibration absorbing device including the mass body coupled to the support member so as to swing about the pendulum fulcrum and rotate about the center of gravity, parameters such as the mass m and the shape (the moment of inertia I) of the mass body 12, the distances R and r, and the rotational angles θ and φ may be determined such that the order of vibration $n_z$ obtained from the formula (11) given above meets the formula (13) or (14) given above. The centrifugal-pendulum vibration absorbing device 10 etc. may be designed such that the order of vibration $n_x$, $n_z$, n obtained from the formula (9), (11), (12), respectively, may perfectly coincide with the order Ntag of vibration to be damped caused by the engine, or may be designed such that the order of vibration $n_x$, $n_z$, n is included within a narrow range centered on the order Ntag (for example, in a range of Ntag±0.05).

The order Ntag of vibration to be damped by the centrifugal-pendulum vibration absorbing device 10 etc. basically corresponds to the number of cylinders of the engine to which the centrifugal-pendulum vibration absorbing device 10 etc. is coupled, and may be determined as Ntag=1.5 for three-cylinder engines and Ntag=2 for four-cylinder engines, for example. It should be noted, however, that the order Ntag of vibration to be damped is not limited to the value corresponding to the number of cylinders of the engine, and may be a value obtained by slightly increasing or decreasing the value corresponding to the number of cylinders of the engine in consideration of the mode of use, the characteristics, or the like of the damper mechanism, the lock-up clutch, or the like. In setting the order of vibration in the centrifugal-pendulum vibration absorbing device 10 etc., further, the value obtained from the formula (9), (11), or (12) may be determined as a temporary order, and the temporary order may be increased or decreased (offset) on the basis of the results of a simulation or an experiment or the like to obtain the final order of vibration.

If the order of vibration n of the mass body 12 in the centrifugal-pendulum vibration absorbing device 10 disposed within the fluid transmission chamber 2 (a liquid chamber) which stores the working oil (a liquid) is determined on the basis of the order Ntag of vibration generated by the engine serving as the drive device in consideration of the force caused by the centrifugal hydraulic pressure (centrifugal liquid pressure) generated within the fluid transmission chamber 2 along with rotation of a rotary element such as the driven member 83 to act on the mass body 12, the vibration absorbing performance of the centrifugal-pendulum vibration absorbing device 10 can be improved adequately setting the order of vibration n of the mass body 12.

In a starting device of a dry type, for example, a fluid transmission device including a pump impeller, a turbine runner, a stator, and so forth may be omitted, or a mass body that serves as a mass of a dynamic damper may be separately provided. The rotary element to which the centrifugal-pendulum vibration absorbing device 10 is coupled is not limited to the driven member (an output element) of the damper mechanism, and may be the intermediate member or the drive member (an input element) of the damper mechanism. Alternatively, the rotary element may be any rotary member mechanically coupled to the drive device to rotate such as a rotary member (a rotary shaft) provided within the transmission other than a rotary element forming the damper mechanism. The correspondence between the main elements of the embodiment described above and the main elements of the invention described in the "SUMMARY OF THE INVENTION" section does not limit the elements of the invention described in the "SUMMARY OF THE INVENTION" section, because the embodiment is an example given for the purpose of specifically describing a mode for carrying out the invention described in the "SUMMARY OF THE INVENTION" section. That is, the embodiment is merely a specific example of the invention described in the "SUMMARY OF THE INVENTION" section, and the invention described in the "SUMMARY OF THE INVENTION" section should be construed on the basis of the description in that section.

While an embodiment has been described above, it is a matter of course that the present invention is not limited to the embodiment in any way, and that the present invention may be modified in various ways without departing from the scope and sprit of the present invention.

The present invention can be utilized in the centrifugal-pendulum vibration absorbing device manufacturing industry.

The invention claimed is:

1. A centrifugal-pendulum vibration absorbing device disposed within a liquid chamber that stores a liquid, the centrifugal-pendulum vibration absorbing device comprising:
   a support member coupled to a rotary element that is rotated by power from a drive device; and
   a mass body supported by the support member so as to be swingable, wherein
   the centrifugal-pendulum vibration absorbing device is structured such that an order of vibration of the mass body is determined on the basis of an order of vibration generated by the drive device in consideration of at least a force that acts on the mass body caused by a centrifugal liquid pressure generated within the liquid chamber when the drive device rotates.

2. The centrifugal-pendulum vibration absorbing device according to claim 1, wherein
   the order of vibration is determined from a value obtained by dividing the force that acts on the mass body caused by the centrifugal liquid pressure when the rotary element is rotated at a certain rotational angular speed by a square of the certain rotational angular speed.

3. The centrifugal-pendulum vibration absorbing device according to claim 2, wherein
   the mass body is coupled to the support member so as to swing about a pendulum fulcrum, and
   when the order of vibration is defined as "n", a distance from a rotational center of the rotary element to the pendulum fulcrum is defined as "R", a distance from the pendulum fulcrum to a center of gravity of the mass body is defined as "r", and a value obtained by dividing the force caused by the centrifugal liquid pressure to act on the mass body by the square of the rotational angular speed and further dividing the resulting quotient by a product of a mass of the mass body and the distance from the pendulum fulcrum to the center of gravity of the mass body is defined as "α",
   the order of vibration "n" is determined using the following relational formula:

$n=\sqrt{(R/r-\alpha)}$.

4. The centrifugal-pendulum vibration absorbing device according to claim 3, wherein
   when the order of vibration generated by the drive device is defined as "Ntag", the centrifugal-pendulum vibration absorbing device is designed to meet the following relational formula:

$Ntag-0.2 \le n \le Ntag+0.2$.

5. The centrifugal-pendulum vibration absorbing device according to claim 1, wherein
   the force caused by the centrifugal liquid pressure is determined using at least a density of the liquid and a difference in an area between an outer peripheral surface and an inner peripheral surface of the mass body.

6. An order setting method for a centrifugal-pendulum vibration absorbing device disposed within a liquid chamber that stores a liquid and including a support member coupled to a rotary element that is rotated by power from a drive device and a mass body supported by the support member so as to be swingable, the method comprising:
   determining an order of vibration of the mass body on the basis of an order of vibration generated by the drive device in consideration of at least a force that acts on the mass body caused by a centrifugal liquid pressure generated within the liquid chamber when the drive device rotates.

7. The order setting method for a centrifugal-pendulum vibration absorbing device according to claim 6, wherein
   the order of vibration is determined from a value obtained by dividing the force that acts on the mass body caused by the centrifugal liquid pressure when the rotary element is rotated at a certain rotational angular speed by a square of the certain rotational angular speed.

8. The order setting method for a centrifugal-pendulum vibration absorbing device according to claim 7, wherein
   the mass body is coupled to the support member so as to swing about a pendulum fulcrum, and
   when the order of vibration is defined as "n", a distance from a rotational center of the rotary element to the pendulum fulcrum is defined as "R", a distance from the pendulum fulcrum to a center of gravity of the mass body is defined as "r", and a value obtained by dividing the force caused by the centrifugal liquid pressure by the square of the rotational angular speed and further dividing the resulting quotient by a product of a mass of the mass body and the distance from the pendulum fulcrum to the center of gravity of the mass body is defined as "α",
   the order of vibration "n" is determined using the following relational formula:

$n=\sqrt{(R/r-\alpha)}$.

9. The order setting method for a centrifugal-pendulum vibration absorbing device according to claim 8, wherein
   when the order of vibration generated by the drive device is defined as "Ntag", the centrifugal-pendulum vibration absorbing device is designed to meet the following relational formula:

$Ntag-0.2 \le n \le Ntag+0.2$.

10. The order setting method for a centrifugal-pendulum vibration absorbing device according to claim 6, wherein
    the force caused by the centrifugal liquid pressure is determined using at least a density of the liquid and a difference in an area between an outer peripheral surface and an inner peripheral surface of the mass body.

* * * * *